(12) United States Patent
Monroe

(10) Patent No.: US 6,463,943 B1
(45) Date of Patent: Oct. 15, 2002

(54) SWIMMING POOL FILTER CLEANING DEVICE

(76) Inventor: Donald Monroe, 68445 Los Gatos Rd., Cathedral City, CA (US) 92234

( * ) Notice: Subject to any disclaimer, the term of this patent is extended or adjusted under 35 U.S.C. 154(b) by 0 days.

(21) Appl. No.: 09/901,773

(22) Filed: Jul. 10, 2001

(51) Int. Cl.$^7$ ................................................. B08B 3/02
(52) U.S. Cl. ........................ 134/152; 134/199; 134/900
(58) Field of Search ................................ 134/900, 199, 134/186, 152; 239/567

(56) References Cited

U.S. PATENT DOCUMENTS

| | | | | |
|---|---|---|---|---|
| 2,322,417 A | * | 6/1943 | Christian | |
| 2,826,209 A | * | 3/1958 | Klein et al. | |
| 2,985,178 A | * | 5/1961 | Christensen, Jr. | |
| 3,583,413 A | * | 6/1971 | Mertzanis | |
| 3,721,252 A | * | 3/1973 | Ayella | |
| 3,820,552 A | * | 6/1974 | Lang et al. | |
| 3,921,914 A | * | 11/1975 | Hatt | |
| 4,160,457 A | * | 7/1979 | Dickson, Jr. et al. | |
| 4,417,596 A | * | 11/1983 | Pahlen | |
| 4,509,545 A | * | 4/1985 | Trotter | |
| 4,517,699 A | * | 5/1985 | Petricka | |
| 4,606,777 A | * | 8/1986 | Brow | |
| 4,821,753 A | * | 4/1989 | Nakamura et al. | |
| 4,836,702 A | * | 6/1989 | Allen | |
| 4,995,749 A | * | 2/1991 | Gornik | |
| 5,184,637 A | * | 2/1993 | Kowis | |
| 5,292,074 A | * | 3/1994 | Clark et al. | |
| 5,297,739 A | * | 3/1994 | Allen | |
| 5,577,668 A | * | 11/1996 | King et al. | |
| 4,723,564 A | * | 2/1998 | West et al. | |

OTHER PUBLICATIONS

U. S. PAT PUB. US2002/0011259 Jan. 2002.*

* cited by examiner

*Primary Examiner*—Frankie L. Stinson
(74) *Attorney, Agent, or Firm*—Goldstein & Lavas, P.C.

(57) ABSTRACT

A swimming pool filter cleaning device including a cylindrical ring-like housing having an upper end, a lower end, an inner surface and an outer surface defining a central opening. The housing has a hollow interior. The housing is dimensioned for receiving a cylindrical pool filter within the central opening thereof. The housing has a water hose connector extending outwardly from the inner surface thereof. The water hose connector is in communication with the hollow interior. The water hose connector has an open outer end adapted for coupling with a standard water hose. A first set of spray nozzles are disposed within the upper end of the housing in a spaced relationship. The first set of spray nozzles are in communication with the hollow interior of the housing.

2 Claims, 3 Drawing Sheets

SWIMMING POOL FILTER CLEANING DEVICE

BACKGROUND OF THE INVENTION

The present invention relates to a swimming pool filter cleaning device and more particularly pertains to allowing a cylindrical pool filter to be easily and effectively cleaned.

The use of swimming pool cleaning devices is known in the prior art. More specifically, swimming pool cleaning devices heretofore devised and utilized for the purpose of cleaning swimming pools are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,901,906 to Bouldin discloses a pool cleaner connected to a whip hose, comprised of a hollow cylinder with a plurality of orifices capable of discharging a pressurized jet stream of water. U.S. Pat. No. 5,082,028 to Jean-Jacques and U.S. Pat. No. 6,003,163 to Celeste disclose pool cleaning heads for attachment to a hose utilizing suction.

While these devices fulfill their respective, particular objective and requirements, the aforementioned patents do not describe a swimming pool filter cleaning device for allowing a cylindrical pool filter to be easily and effectively cleaned.

In this respect, the swimming pool filter cleaning device according to the present invention substantially departs from the conventional concepts and designs of the prior art, and in doing so provides an apparatus primarily developed for the purpose of allowing a cylindrical pool filter to be easily and effectively cleaned.

Therefore, it can be appreciated that there exists a continuing need for a new and improved swimming pool filter cleaning device which can be used for allowing a cylindrical pool filter to be easily and effectively cleaned. In this regard, the present invention substantially fulfills this need.

SUMMARY OF THE INVENTION

In the view of the foregoing disadvantages inherent in the known types of swimming pool cleaning devices now present in the prior art, the present invention provides an improved swimming pool filter cleaning device. As such, the general purpose of the present invention, which will be described subsequently in greater detail, is to provide a new and improved swimming pool filter cleaning device which has all the advantages of the prior art and none of the disadvantages.

To attain this, the present invention essentially comprises a cylindrical ring-like housing having an upper end, a lower end, an inner surface and an outer surface defining a central opening. The housing has a hollow interior. The housing is dimensioned for receiving a cylindrical pool filter within the central opening thereof. The housing has a water hose connector extending outwardly from the inner surface thereof. The water hose connector is in communication with the hollow interior. The water hose connector has an open outer end adapted for coupling with a standard water hose. The water hose connector has a control valve disposed therein. The control valve has a corresponding manipulation switch disposed on the water hose connector. A first set of spray nozzles are disposed within the upper end of the housing in a spaced relationship. The first set of spray nozzles are in communication with the hollow interior of the housing. A second set of spray nozzles are disposed within the inner surface of the housing in a spaced relationship. The second set of spray nozzles are in communication with the hollow interior of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved swimming pool filter cleaning device which has all the advantages of the prior art swimming pool cleaning devices and none of the disadvantages.

It is another object of the present invention to provide a new and improved swimming pool filter cleaning device which may be easily and efficiently manufactured and marketed.

It is a further object of the present invention to provide a new and improved swimming pool filter cleaning device which is of durable and reliable construction.

An even further object of the present invention is to provide a new and improved swimming pool filter cleaning device which is susceptible of a low cost of manufacture with regard to both materials and labor, and which accordingly is then susceptible of low prices of sale to the consuming public, thereby making such a swimming pool filter cleaning device economically available to the buying public.

Even still another object of the present invention is to provide a new and improved swimming pool filter cleaning device for allowing a cylindrical pool filter to be easily and effectively cleaned.

Lastly, it is an object of the present invention to provide a new and improved swimming pool filter cleaning device including a cylindrical ring-like housing having an upper end, a lower end, an inner surface and an outer surface defining a central opening. The housing has a hollow interior. The housing is dimensioned for receiving a cylindrical pool filter within the central opening thereof. The housing has a water hose connector extending outwardly from the inner surface thereof. The water hose connector is in communication with the hollow interior. The water hose connector has an open outer end adapted for coupling with a standard water hose. A first set of spray nozzles are disposed within the upper end of the housing in a spaced relationship. The first set of spray nozzles are in communication with the hollow interior of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
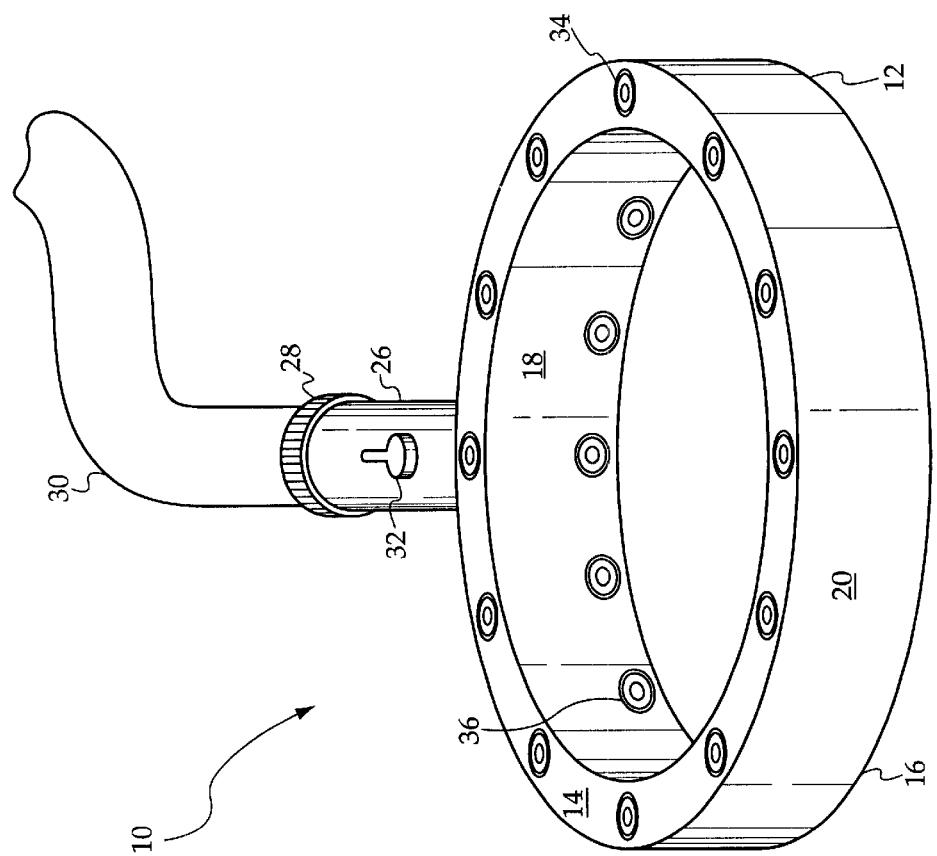
FIG. 1 is a perspective view of the preferred embodiment of the swimming pool filter cleaning device constructed in accordance with the principles of the present invention.
Figure 2:
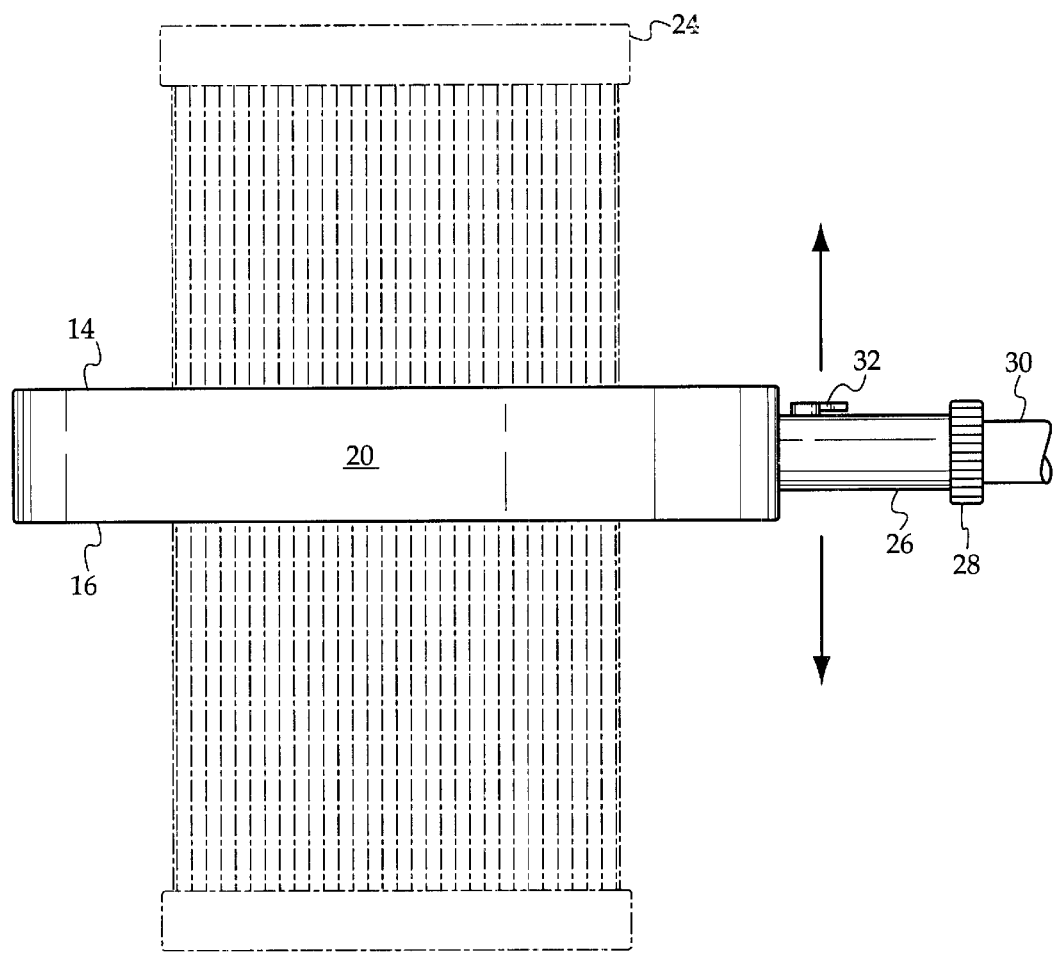
FIG. 2 is a side view of the present invention illustrated in use.
Figure 3:
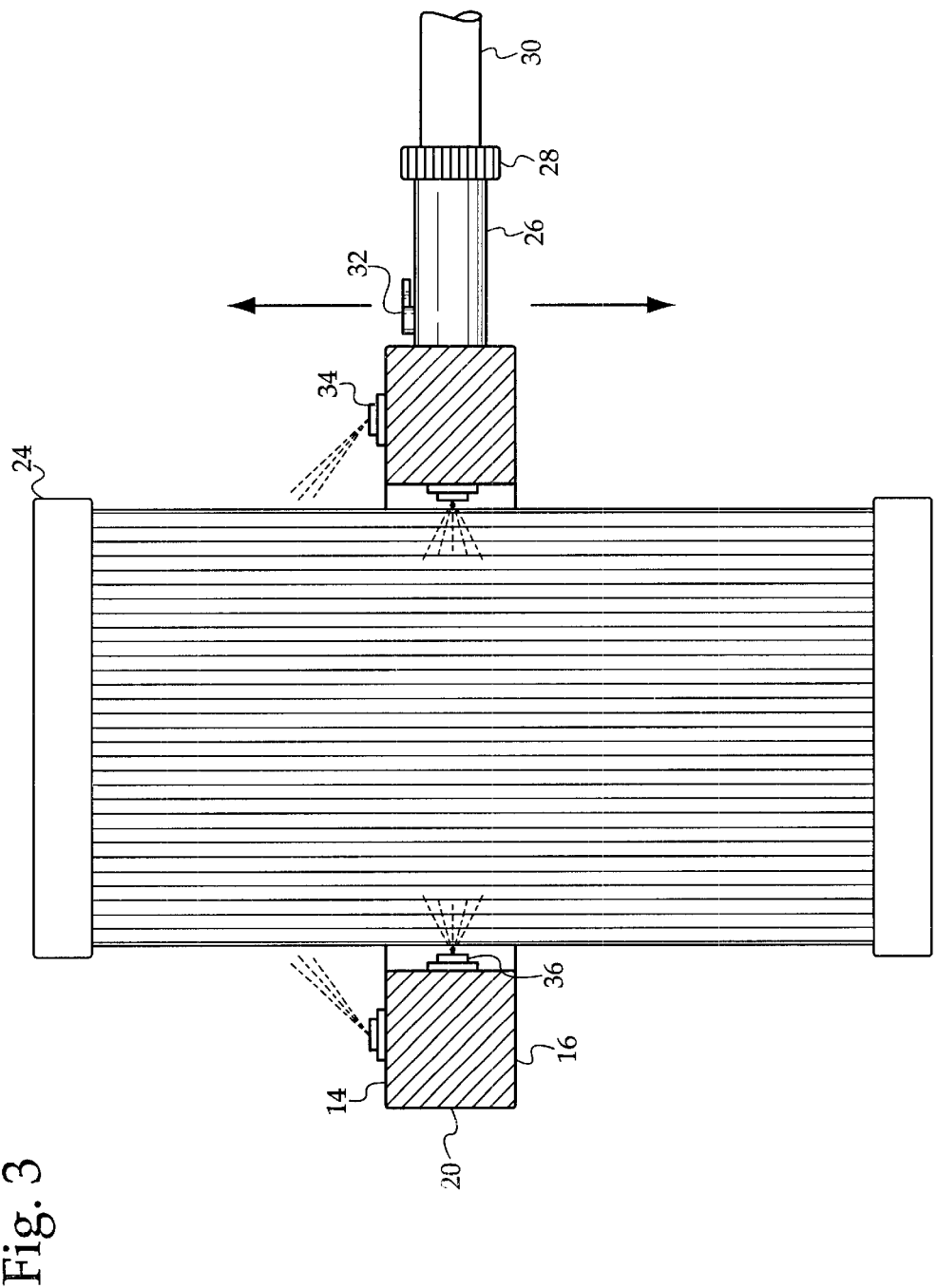
FIG. 3 is a cross-sectional side view of the present invention illustrated in use.

With reference now to the drawings, and in particular, to FIGS. 1 through 3 thereof, the preferred embodiment of the new and improved swimming pool filter cleaning device embodying the principles and concepts of the present invention and generally designated by the reference number 10 will be described.

Specifically, it will be noted in the various Figures that the device relates to a swimming pool filter cleaning device for allowing a cylindrical pool filter to be easily and effectively cleaned. In its broadest context, the device consists of a cylindrical ring-like housing, a first set of spray nozzles, and a second set of spray nozzles. Such components are individually configured and correlated with respect to each other so as to attain the desired objective.

The cylindrical ring-like housing 12 has an upper end 14, a lower end 16, an inner surface 18 and an outer surface 20 defining a central opening 22. Note FIG. 1. The housing 12 has a hollow interior. The hollow interior serves as a containment chamber for a supply of water. The housing 12 is dimensioned for receiving a cylindrical pool filter 24 within the central opening 22 thereof. Note FIGS. 2 and 3. The housing 12 has a water hose connector 26 extending outwardly from the outer surface thereof. The water hose connector 26 is in communication with the hollow interior. The water hose connector 26 has an open outer end 28 adapted for coupling with a standard water hose 30. The open outer end 28 also includes the requisite coupling thereon to facilitate a proper coupling with the water hose 30. The water hose connector 26 has a control valve disposed therein. The control valve, although not illustrated, is essentially a standard ball valve that can rotate to an open orientation to allow the passage of water there through. The control valve has a corresponding manipulation switch 32 disposed on the water hose connector 26. The switch 32 will allow the control valve to open and close.

The first set of spray nozzles 34 are disposed within the upper end 14 of the housing 12 in a spaced relationship. The first set of spray nozzles 34 are in communication with the hollow interior of the housing 12. The first set of spray nozzles 34 will direct water upwardly and at an inward angle. Note FIG. 3.

The second set of spray nozzles 36 are disposed within the inner surface 18 of the housing 12 in a spaced relationship. The second set of spray nozzles 36 are in communication with the hollow interior of the housing 12. The second set of spray nozzles 36 will direct water inwardly. Note FIG. 3.

In use, the pool filter 24 is positioned on a recipient surface and the housing 12 is placed over the top of the filter 24. The water is activated to spray out of the nozzles 34,36. The housing 12 is then slowly lowered over the filter allowing the sprayed water to effectively clean the folds of the filter 24 thereby removing the build-up of dirt and bacteria therefrom.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A swimming pool filter cleaning device for allowing a cylindrical pool filter to be easily and effectively cleaned comprising, in combination:

a cylindrical ring-like housing having an upper end, a lower end, an inner surface and an outer surface defining a central opening, the housing having a hollow interior, the housing being dimensioned for receiving a cylindrical pool filter within the central opening thereof, the housing having a water hose connector extending outwardly from the outer surface thereof, the water hose connector being in communication with the hollow interior, the water hose connector having an open outer end adapted for coupling with a standard water hose, the water hose connector having a control valve disposed therein, the control valve having a corresponding manipulation switch disposed on the water hose connector;

a first set of spray nozzles disposed within the upper end of the housing in a spaced relationship, the first set of spray nozzles being in communication with the hollow interior of the housing; and a second set of spray nozzles disposed within the inner surface of the housing in a spaced relationship, the second set of spray nozzles being in communication with the hollow interior of the housing.

2. A swimming pool filter cleaning device for allowing a cylindrical pool filter to be easily and effectively cleaned comprising, in combination:

a cylindrical ring-like housing having an upper end, a lower end, an inner surface and an outer surface defining a central opening, the housing having a hollow interior, the housing being dimensioned for receiving a cylindrical pool filter within the central opening thereof, the housing having a water hose connector extending outwardly from the outer surface thereof, the water hose connector being in communication with the hollow interior, the water hose connector having an open outer end adapted for coupling with a standard water hose;

a first set of spray nozzles disposed within the upper end of the housing in a spaced relationship, the first set of spray nozzles being in communication with the hollow interior of the housing; and a second set of spray nozzles disposed within the inner surface of the housing in a spaced relationship, the second set of spray nozzles being in communication with the hollow interior of the housing.

* * * * *